(12) United States Patent
Ogimoto et al.

(10) Patent No.: US 7,075,036 B2
(45) Date of Patent: Jul. 11, 2006

(54) ELECTRONIC PART COMPRESSION BONDING APPARATUS AND METHOD

(75) Inventors: Shinichi Ogimoto, Kanagawa (JP); Koji Morita, Kanagawa (JP)

(73) Assignee: Shibaura Mechatronics Corporation, Yokohama (JP)

( * ) Notice: Subject to any disclaimer, the term of this patent is extended or adjusted under 35 U.S.C. 154(b) by 27 days.

(21) Appl. No.: 10/479,960

(22) PCT Filed: Jun. 7, 2002

(86) PCT No.: PCT/JP02/05697

§ 371 (c)(1), (2), (4) Date: Jun. 16, 2004

(87) PCT Pub. No.: WO02/101815

PCT Pub. Date: Dec. 19, 2002

(65) Prior Publication Data

US 2004/0217100 A1 Nov. 4, 2004

(30) Foreign Application Priority Data

Jun. 8, 2001 (JP) .............................. 2001-174917

(51) Int. Cl.
*H01L 21/603* (2006.01)
(52) U.S. Cl. ..................... 219/243; 228/102; 219/85.16
(58) Field of Classification Search ................ 219/243, 219/85.16, 85.18–85.19; 228/102, 1.1, 110.1; 156/73.1; 257/698, 692
See application file for complete search history.

(56) References Cited

U.S. PATENT DOCUMENTS

| | | | | |
|---|---|---|---|---|
| 5,894,982 A | * | 4/1999 | Hasegawa et al. .......... | 228/106 |
| 5,985,064 A | * | 11/1999 | Sato ............................. | 156/64 |
| 6,096,575 A | * | 8/2000 | Okada et al. ................ | 438/106 |
| 6,494,359 B1 | * | 12/2002 | Hasegawa .................... | 228/102 |
| 2002/0109000 A1 | * | 8/2002 | Rinne .......................... | 228/102 |

FOREIGN PATENT DOCUMENTS

| | | | |
|---|---|---|---|
| JP | 5-144878 | | 6/1993 |
| JP | 6-151524 | | 5/1994 |
| JP | 7-130795 | * | 5/1995 |
| JP | 7-153795 | * | 6/1995 |
| JP | 8-213434 | * | 8/1996 |
| JP | 9-082764 | | 3/1997 |
| JP | 9-153525 | * | 6/1997 |
| JP | 9-181131 | | 7/1997 |
| JP | 9-186191 | | 7/1997 |
| JP | 9-213740 | | 8/1997 |
| JP | 10-4124 | * | 1/1998 |

(Continued)

*Primary Examiner*—John A. Jeffery
(74) *Attorney, Agent, or Firm*—Oblon, Spivak, McClelland, Maier & Neustadt, P.C.

(57) ABSTRACT

An electronic part compression bonding apparatus includes a compression bonding unit which bonds the electronic parts onto the substrate by thermocompression, a pressure supply unit, a pressure control unit which controls pressure, a heating unit which heats the compression bonding unit, a temperature control unit, and a thermocompression bonding control unit which controls the pressure control unit and the heating unit based on thermocompression bonding condition data in which at least one of pressure and heating temperature is variably set during a process from start until completion of a thermocompression bonding operation of the electronic parts. In the thermocompression bonding condition data, the pressure is set to a first pressure in a first stage in a process of the thermocompression bonding operation and a second pressure, which is lower than the first pressure, in a second stage that follows the first stage.

13 Claims, 9 Drawing Sheets

FOREIGN PATENT DOCUMENTS

| | | | |
|---|---|---|---|
| JP | 10-107404 | * | 4/1998 |
| JP | 10-175973 | * | 10/1998 |
| JP | 11-135564 | | 5/1999 |
| JP | 11-186338 | * | 7/1999 |
| JP | 11-274701 | * | 10/1999 |
| JP | 2000-180883 | | 6/2000 |
| JP | 2000-277893 | | 10/2000 |
| JP | 2000-306927 | * | 11/2000 |

* cited by examiner

ELECTRONIC PART COMPRESSION BONDING APPARATUS AND METHOD

TECHNICAL FIELD

The present invention relates to an electronic part compression bonding apparatus and an electronic part compression bonding method, by which electronic parts are bonded onto a substrate by compression. The present invention relates particularly to a technology which prevents poor connection of the electronic parts to the substrate by accurately controlling an elongation amount of the electronic parts to be bonded onto the substrate by thermocompression.

BACKGROUND ART

Conventionally, an electronic part compression bonding apparatus has been known which mounts electronic parts, each formed by a film-shaped member, onto a substrate made of glass or the like. This apparatus has been known as an electronic part compression bonding apparatus for manufacturing a flat panel display typified by a plasma display panel (PDP).

Figure 1:
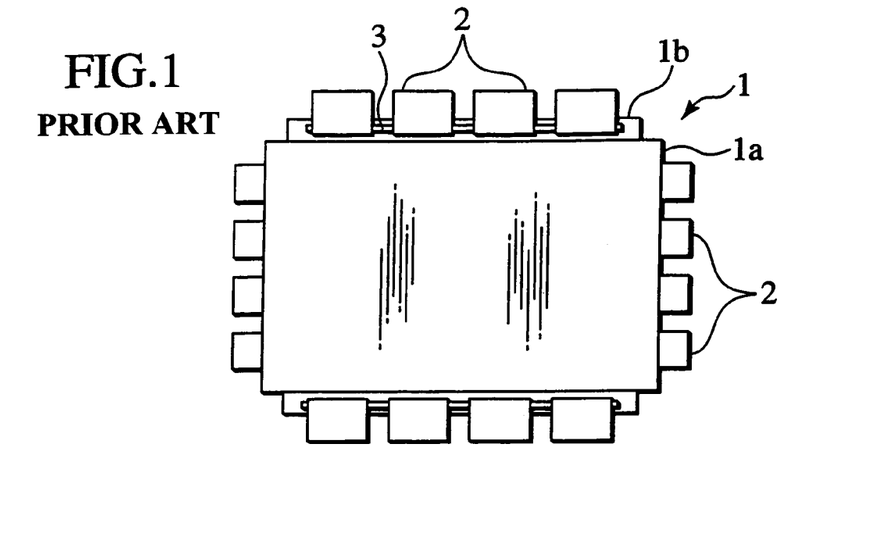
FIG. 1 is a plan view showing an example of a glass substrate to which electronic parts are bonded by thermocompression.
Figure 2:
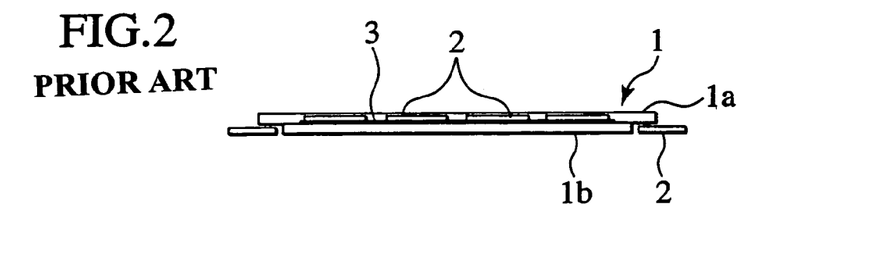
FIG. 2 is a side view of FIG. 1.

FIG. 1 is a plan view showing an example of a glass substrate on which electronic parts are mounted by an electronic part compression bonding apparatus, and FIG. 2 is a side view thereof. The glass substrate 1 shown in FIGS. 1 and 2 is formed by adhering two types of substrates 1a and 1b having different sizes. In FIG. 2, a plurality of electronic parts 2 are mounted on the bottom surface of the upper substrate 1a and the top surface of the lower substrate 1b, respectively, along lines of each of the substrates 1 through anisotropic conductive films (hereinafter, referred to as "ACF") 3.

In the electronic part compression bonding apparatus for manufacturing this type of glass substrate, the ACFs 3 are adhered on the glass substrate 1 along the lines where the electronic parts 2 are mounted. Thereafter, the electronic parts 2 are preliminarily attached to the glass substrate 1 by the use of adhesiveness of the ACFs 3. The preliminarily attached electronic parts 2 are then heated and pressed to the glass substrate 1 using the electronic part compression bonding apparatus, thus connecting leads formed on the glass substrate 1 and those of the electronic parts 2.

Figure 3:
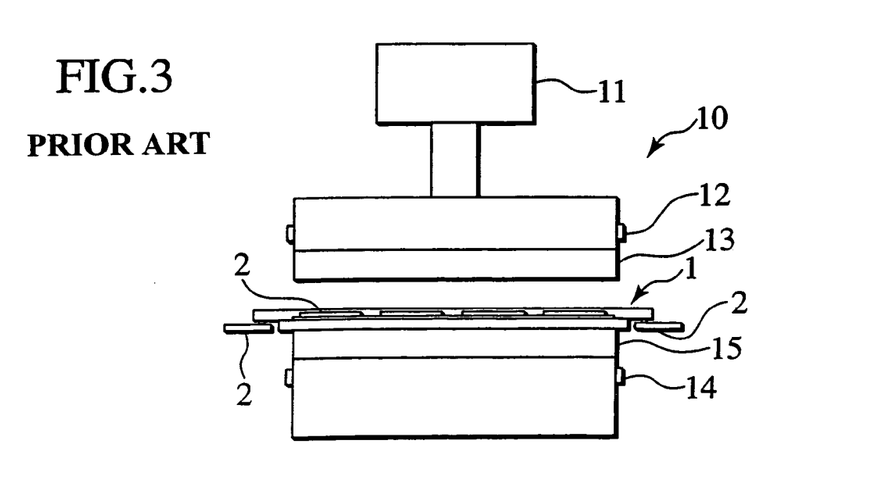
FIG. 3 is a front view showing an example of a construction of a conventional electronic part compression bonding apparatus.

FIG. 3 shows an example of a conventional electronic part compression bonding apparatus 10. The electronic part compression bonding apparatus 10 is provided with a long compression tool 13 which is raised/lowered by a pressure cylinder 11 and has a built-in heater 12, and a back-up tool 15 as a pressure receiving tool which is located to face the compression tool 13, raised and lowered by an unillustrated lifting means and has a built-in heater 14.

Next, a compression bonding procedure by the use of the electronic part compression bonding apparatus 10 is described.

First of all, the glass substrate 1 where the electronic parts 2 are preliminarily attached is put on an unillustrated substrate stage. The line on the glass substrate 1, which should be bonded with the electronic parts 2 by compression this time, is positioned to face the compression tool 13. Next, the back-up tool 15 is raised and supports the glass substrate 1 from the bottom, and subsequently or simultaneously, the compression tool 13 is lowered by the pressure cylinder 11. Accordingly, by pressure applied from the pressure cylinder 11 and heat from the heaters 12 and 14, the electronic parts 2 preliminarily attached to one of the lines of the glass substrate 1 are bonded at once to the glass substrate 1 by thermocompression through the ACFs 3. Upon completion of this thermocompression bonding, the compression tool 13 is raised and the back-up tool 15 is lowered.

Thereafter, if there remain lines on the glass substrate 1, where the electronic parts 2 should be bonded by compression, the line of the glass substrate 1, which should be bonded with the electronic parts 2 next, is positioned to face the compression tool 13 by driving the substrate stage.

On the other hand, if there remain no lines on the glass substrate 1, where the electronic parts 2 should be bonded by compression, the glass substrate 1 on which the electronic parts 2 are completely bonded is whisked off the subsequent stage. Thereafter, the electronic part compression bonding apparatus 10 receives a new glass substrate (i.e. a glass substrate to which the electronic parts 2 are preliminarily attached) 1 from the preceding process and repeats the compression bonding operation mentioned above.

Incidentally, the film-shaped member that is a base material of each of the electronic parts 2 is made of, for example, polyimide resin. Therefore, it is known that the electronic parts 2 elongate during thermocompression bonding thereof by the electronic part compression bonding apparatus 10 described earlier. Thus, the electronic parts 2 are made to have relatively small dimensions, allowing for elongation thereof during thermocompression bonding.

However, the elongation amount required during the thermocompression bonding is different for each type of the electronic parts 2, more specifically, for each of the thickness, size, shape and the like of the film-shaped member. Therefore, it has been difficult to satisfactorily adjust the amounts of elongation which occurs during the thermocompression bonding, with respect to various types of the electronic parts 2.

When the actual amount of elongation which occurs during the thermocompression bonding is different from a required amount, the electronic parts and the glass substrate may be poorly connected to each other, and this has been a disadvantage.

Meanwhile, one trend is that leads of the electronic part 2, which are to be connected to the leads of the substrate 1, are becoming increasingly fine-pitched as a flat panel display and the like has become highly functional. Therefore, there has been a demand for an improvement in accuracy of thermocompression bonding by the electronic part compression bonding apparatus 10.

SUMMARY OF THE INVENTION

The present invention was accomplished in order to address the problems described in the foregoing.

It is an object of the present invention to provide an electronic part compression bonding apparatus and an electronic part compression bonding method, which can prevent poor connection of electronic parts and a substrate by accurately adjusting an elongation amount of the electronic parts when bonding the electronic parts onto the substrate by thermocompression.

The present invention variably controls pressure and heating conditions for bonding the electronic parts by compression depending on elongation properties of the electronic parts, while focusing on a relation between the elongation properties of the electronic parts and pressure and heat applied to the electronic parts to be bonded to the substrate by thermocompression.

According to a characteristic of the present invention, provided is an electronic part compression bonding apparatus, comprising: a compression bonding unit which performs thermocompression bonding of electronic parts by pressing the electronic parts onto a substrate by a raising/lowering operation of a lifting unit; a pressure supply unit which applies pressure to the compression bonding unit; a pressure control unit which controls pressure supplied by the pressure supply unit; a heating unit which is built in the compression bonding unit and heats the compression bonding unit; a temperature control unit which controls a heating value of the heating unit; a substrate support unit which is located to face the compression bonding unit and supports the substrate during a thermocompression bonding operation by the compression bonding unit; and a thermocompression bonding control unit which controls the pressure control unit and the heating unit based on thermocompression bonding condition data which is stored in a storage section and in which at least one of pressure and heating temperature is variably set during a process from start until completion of the thermocompression bonding operation of the electronic part, wherein, in the thermocompression bonding condition data, the pressure is set to a first pressure at a first stage of the process of the thermocompression bonding operation and to second pressure, which is lower than the first pressure, in a second stage which follows the first stage.

According to another characteristic of the present invention, provided is an electronic part compression bonding apparatus, comprising: a compression bonding unit which performs thermocompression bonding of electronic parts by pressing the electronic parts onto a substrate by a raising/lowering operation of a lifting unit; a pressure supply unit which applies pressure to the compression bonding unit; a pressure control unit which controls pressure supplied by the pressure supply unit; a heating unit which is built in the compression bonding unit and heats the compression bonding unit; a temperature control unit which controls a heating value of the heating unit; a substrate support unit which is located to face the compression bonding unit and supports the substrate during a thermocompression bonding operation by the compression bonding unit; a cooling unit which cools a cooling member which is located in the substrate support unit; and a thermocompression bonding control unit which controls the temperature control unit and the cooling unit based on thermocompression bonding condition data stored in a storage section.

According to yet another characteristic of the present invention, provided is an electronic part compression bonding apparatus, comprising: a compression bonding unit which performs thermocompression bonding of electronic parts by pressing the electronic parts onto a substrate by a raising/lowering operation of a lifting unit; a pressure supply unit which applies pressure to the compression bonding unit; a pressure control unit which controls pressure supplied by the pressure supply unit; a heating unit which is built in the compression bonding unit and heats the compression bonding unit; a temperature control unit which controls a heating value of the heating unit; a substrate support unit which is located to face the compression bonding unit and supports the substrate during a thermocompression bonding operation by the compression bonding unit; a thermocompression bonding control unit which controls the pressure control unit and the heating unit based on thermocompression bonding condition data which is stored in a storage section and in which at least one of pressure and heating temperature is set to be variable during a process from start until completion of the thermocompression bonding operation of the electronic parts; and a temperature detection unit which measures temperature to heat the electronic parts during a period of the thermocompression bonding and sends first detection data which indicates to the thermocompression bonding control unit that temperature of the electronic parts has reached predetermined temperature, wherein, upon receipt of the first detection data sent from the temperature detection unit, the thermocompression bonding control unit instructs the pressure control unit to change the pressure from first pressure to second pressure which is lower than the first pressure.

According to yet another characteristic of the present invention, provided is an electronic part thermocompression bonding method, in which electronic parts are heated by a heating unit built in a compression bonding unit and pressed onto a substrate by raising/lowering the compression bonding unit to bond the electronic parts onto a substrate by thermocompression, the method comprising: previously storing, in a storage section, thermocompression bonding condition data in which at least one of pressure and heating temperature is variably set during a process from start until completion of the thermocompression bonding operation of the electronic parts; and controlling pressure supplied to the electronic parts by the compression bonding unit so that, during the thermocompression bonding operation of the electronic parts, the pressure becomes first pressure in a first stage of a process of the thermocompression bonding operation and second pressure, which is lower than the first pressure, in a second stage which follows the first stage, based on the thermocompression bonding condition data stored in the storage section.

According to the present invention, at least one of the pressure and temperature applied by a compression tool is variably controlled during the thermocompression bonding operation of the electronic parts onto the substrate by the compression tool. Thus, compression bonding conditions of a heating tool are changed.

Specifically, the pressure control unit and the heating unit are controlled based on the thermocompression bonding condition data in which at least one of the pressure and heating temperature is variably set during the process from start until completion of the thermocompression bonding operation of the electronic parts. In the thermocompression bonding condition data, the pressure is set to be the first pressure at the first stage in the process of the thermocompression bonding operation and to the second pressure, which is lower than the first pressure, at the second stage that follows the first stage. Thus, an elongation amount of the electronic parts during thermocompression bonding thereof onto the substrate is accurately controlled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BEST MODE FOR CARRYING OUT THE INVENTION

An embodiment of the electronic part compression bonding apparatus and the electronic part compression bonding method according to the present invention is detailed hereinbelow with reference to FIGS. 4 to 17.

Figure 4:
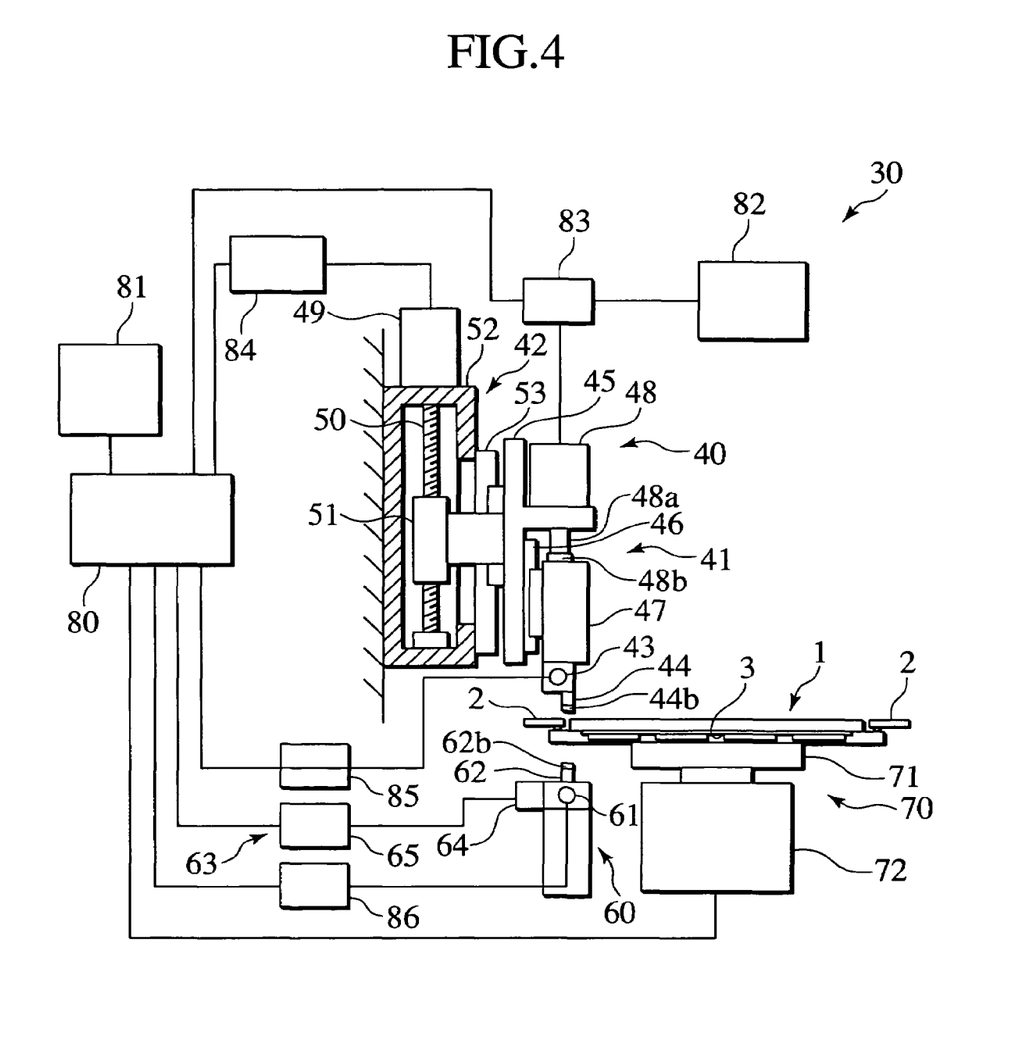
FIG. 4 is a cross-sectional side view partially showing a construction of an electronic part compression bonding apparatus according to an embodiment of the present invention.

FIG. 4 is a cross-sectional side view partially showing an example of a construction of the electronic part compression bonding apparatus according to the embodiment of the present invention. Note that, in FIG. 4, the same components as those in the conventional apparatus are denoted with the same reference numerals to omit description thereof.

In FIG. 4, the electronic part compression bonding apparatus 30 according to the embodiment of the present invention includes a compression bonding head unit 40, a pressure receiving unit 60 placed to face the compression bonding head unit 40, a substrate stage 70, and a control device 80.

The compression bonding head unit 40 is provided with a head section 41, a lifting device 42 which raises and lowers the head section 41. In the head section 41, a long compression tool 44 having a built-in heater 43 is fixed to a lifting block 47 which is supported to be able to move up and down by a base plate 45 through a guide rail 46. The lifting block 47 is connected to an actuation rod 48a of an air cylinder 48 which is fixed to the base plate 45. In addition, the air cylinder 48 is provided with a pressure detection section 48b which detects pressure applied to the electronic parts by the compression tool 44. The pressure detection section 48b detects whether the pressure applied to the electronic parts by the compression tool 44 has reached a predetermined pressure is set in advance. Once it is detected that the pressure has reached the predetermined pressure, the pressure detection section 48b sends a predetermined pressure detection signal to a control device 80. Upon receipt of the predetermined pressure detection signal sent from the pressure detection section 48b, the control device 80 changes pressure supplied to the compression tool 44.

The lifting device 42 is constituted by a ball screw 50 which is rotated by a motor 49 supported by a later described frame body 52, and a nut member 51. The nut member 51 is connected to the base plate 45 supported to be able to move up and down by the frame body 52 through a guide rail 53.

The pressure receiving unit 60 has a built-in heater 61 and is also provided with a back-up tool 62 as a pressure receiving tool which can be moved up and down by unillustrated lifting means. Temperature detecting means 62b and 44b, which detects temperature of the electronic parts 2 or the glass substrate 1, may be provided in one of or both of the back-up tool 62 and the compression tool 44. The temperature detecting means 62b and 44b measures whether the temperature of the electronic parts 2 or the glass substrate 1 has reached predetermined temperature which is set in advance. Once the temperature reaches the predetermined temperature, the temperature detecting means 62b and 44b sends predetermined temperature detection data to the control device 80. Upon receipt of the predetermined temperature detection data from the temperature detecting means 62b and 44b, the control device 80 controls changes of temperature to heat the compression tool 44 or the back-up tool 62.

Further, a cooling member 64 included in a cooling device 63 is attached onto a side of the back-up tool 62. The cooling member 64 is, for example, a hollow tube. The cooling device 63 cools down the back-up tool 62 as appropriate by, for example, supplying cold air to the cooling member 64 from a cold air supply device 65.

Note that, in the pressure receiving unit 60, the back-up tool 62 is set so that the top surface of the back-up tool 62 (that is, a surface contacting the glass substrate 1) comes at the same height level as the bottom surface of the glass substrate 1 supported by the substrate stage 70, when the back-up tool 62 is brought to a lifted position.

The substrate stage 70 includes a stage 71 which attracts and holds the glass substrate 1 and a moving device 72 which movably supports the stage 71 in X and Y directions, which are perpendicular to each other, as well as a direction of rotation (θ direction). The substrate stage 70 receives the glass substrate 1 which has the electronic parts 2 preliminarily attached thereto through the ACFs 3 and is supplied from the preceding process of a preliminary compression bonding device or the like. The substrate stage 70 then moves the glass substrate 1 to a position where the preliminarily attached electronic parts 2 are bonded by compression to the glass substrate 1 by the compression tool 44. At the same time, the substrate stage 70 passes the glass substrate 1, in which the compression bonding operation is completed, to the following process of a substrate storage device or the like.

The control device 80 is provided with a storage section 81. In addition, the control device 80 is connected to each of a pressure control section 83 placed between the air cylinder 48 and a compressed air supply source 82, a motor control section 84 which controls rotation of the motor 49, thus controlling an ascent/descent speed of the compression tool 44, a temperature control section 85 which controls the temperature of the heater 43, a temperature control section 86 which controls the temperature of the heater 61, the cold air supply device 65 which supplies cold air to the cooling member 64, and the moving device 72 which moves the stage 71.

The control device 80 controls pressure of compressed air supplied to the air cylinder 48 through the pressure control section 83, enabling control of the pressure applied by the compression tool 44 while pressing and heating the electronic parts 2. Specifically, the air cylinder 48 constructs compression means which applies pressure to the compression tool 44.

Moreover, the control device 80 controls drive of the motor 49 through the motor control section 48, enabling control of the ascent/descent speed of the compression tool 44.

Furthermore, the control device 80 controls heating values of the heaters 43 and 61 through the temperature control sections 85 and 86, respectively, enabling control of the temperature of the compression tool 44 and the back-up tool 62.

Yet further, the control device 80 controls the cold air supply device 65, thus allowing on/off control of cold air to be supplied to the cooling member 64.

In the storage section 81, thermocompression bonding conditions based on the elongation amount of the electronic parts 2 are stored. The thermocompression bonding conditions include, for example, a temperature condition of the compression tool 44, a condition of pressure applied by the compression tool, and an impact load application condition, during a thermocompression bonding operation period when the electronic parts 2 are pressed and heated by the compression tool 44.

Next, control of the thermocompression bonding conditions in this embodiment is described in detail.

First, control to suppress the elongation amount of the electronic parts 2 is described.

In general, once pressure applied by the compression tool 44 is increased, force of constraint of the compression tool 44 to the electronic parts 2 is increased. Thus, elongation of the electronic parts 2 is suppressed.

Figure 5:
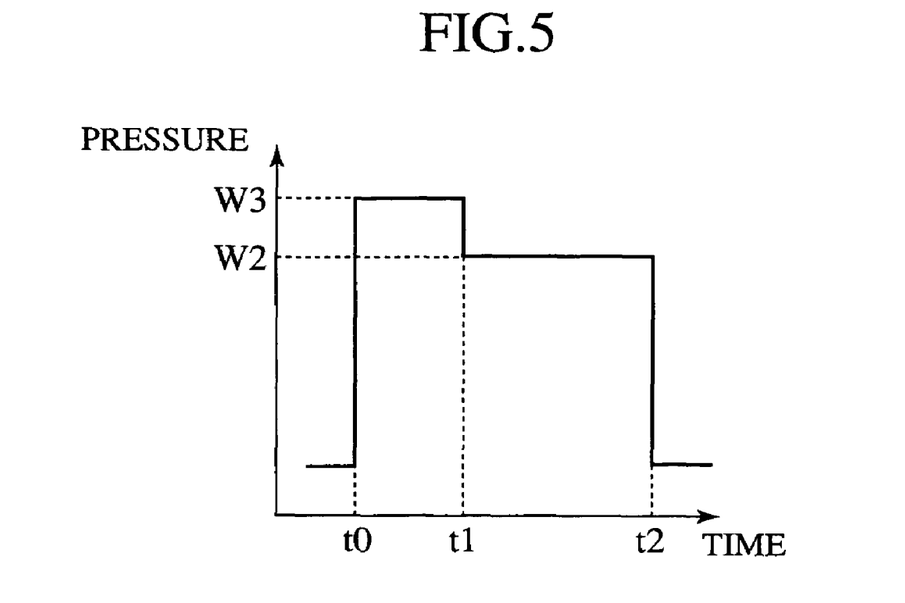
FIG. 5 is a diagram showing an example of a relation between applied pressure and time when bonding the electronic parts by compression in the embodiment of the present invention.

FIG. 5 shows an example of control of the pressure conditions from the viewpoint of the above. As shown in FIG. 5, during a period from start time t0 of thermocompression bonding of the electronic parts 2 by the compression tool 44 until time t1, pressure W3 that is higher by a predetermined amount than pressure W2 required for thermocompression boding of the electronic parts 2 is applied to the electronic parts 2. Meanwhile, during a period from the time t1 until completion time t2 of thermocompression bonding, the pressure W2 that is lower than the pressure W3 is applied to the electronic parts 2. Thus, the elongation amount of the electronic parts 2 can be suppressed.

Note that, when the pressure W3 is too high, an adhesive which adheres the electronic parts 2 to the glass substrate 1 is pushed out from the glass substrate 1, causing poor connection therebetween. In order to avoid the poor connection, the appropriate pressure W3 is decided based on the type and quantity of the adhesive.

In addition, when the temperature to heat the electronic parts 2 increases, a film member which constructs each of the electronic parts 2 deforms, causing further elongation of the electronic parts 2.

Figure 6:
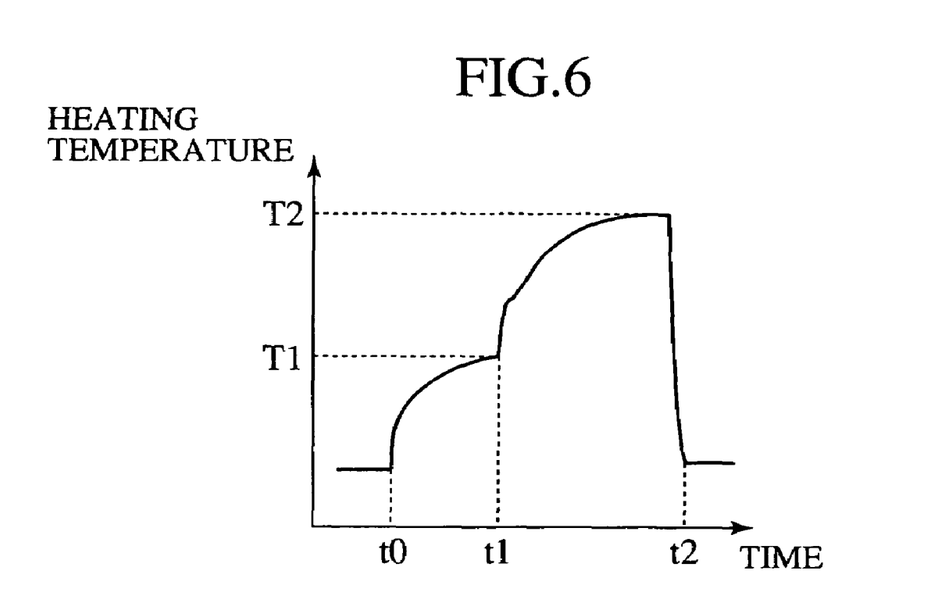
FIG. 6 is a diagram showing an example of a relation between temperature applied to a compression tool and time when bonding the electronic parts by compression in the embodiment of the present invention.

FIG. 6 shows an example of temperature condition control from the viewpoint of the above. As shown in FIG. 6, during the period from the start time t0 of thermocompression bonding of the electronic parts 2 by the compression tool 44 until the time t1, the electronic parts 2 are heated at heating temperature T1 that is lower by predetermined degrees than heating temperature T2 required for thermocompression bonding of the electronic parts 2. Meanwhile, during the period from the time t1 until the completion time t2 of thermocompression bonding, the electronic parts 2 are heated at heating temperature T2 that is higher than the heating temperature T1. Thus, the elongation amount of the electronic parts 2 can be suppressed.

Further, in a case where both the pressure applied to the electronic parts 2 and the temperature to heat the same are variably controlled, the elongation amount of the electronic parts 2 is further suppressed if the pressure is increased to W3 before the time t1 of FIG. 6.

Note that, the predetermined time t1 in FIGS. 5 and 6 may be time after a certain period is elapsed from the time t0. In addition, the time t1 may be decided variably based on the type of electronic parts 2 to be bonded onto the glass substrate 1 by thermocompression, temperature of compression bonding, the type of adhesive for adhering the electronic parts 2 to the glass substrate 1, or the like.

Second, the control to increase the elongation amount of the electronic parts 2 is described.

In a case where, for example, the heating temperature applied to the electronic parts 2 during compression bonding is fixed, the pressure applied to the electronic parts 2 in the initial stage of the thermocompression bonding operation is set to be smaller than a predetermined pressure required for thermocompression bonding, and thereafter increased to the predetermined pressure. Thus, the elongation amount of the electronic parts 2 is larger than that of the electronic parts 2 that are pressed with the predetermined pressure from the initial stage.

On the other hand, in a case where the pressure applied to the electronic parts 2 by the compression tool 44 is fixed, the electronic parts 2 are heated at a predetermined temperature required for thermocompression bonding, from the initial stage of the thermocompression bonding operation. Thus, the elongation amount of the electronic parts 2 is larger than that of the electronic parts 2 heated at the heater temperature which is set to be lower than the predetermined temperature in the initial stage and thereafter increased to the predetermined temperature.

Moreover, in a case where the temperature applied to the electronic parts 2 and pressure applied thereto by the compression tool 44 during thermocompression bonding are fixed, an impact load when the compression tool 44 contacts the electronic parts 2 (that is, a descent speed of the compression tool 44) is set small. Thus, the elongation amount of the electronic parts is increased.

Based on the foregoing findings, in this embodiment, the elongation amount of the electronic parts 2 are optimally adjusted by variably controlling any one of or a combination of these thermocompression bonding conditions.

Next, specific examples of control of the thermocompression bonding conditions are described respectively.

1) Load Control

When it is desired to increase the elongation amount of the electronic parts 2, the control device 80 adjusts air pressure supplied to the air cylinder 48 through the pressure control section 83 so that the following is realized. As shown by a solid line in FIG. 7, during the period from the start time t0 of the thermocompression bonding operation until the time t1, the pressure applied to the electronic parts 2 by the compression tool 44 is set to W1 which is smaller than the predetermined pressure W2 required for thermocompression bonding. During the following period until the completion time t2, the pressure applied to the electronic parts 2 is set to the predetermined pressure W2.

Figure 7:
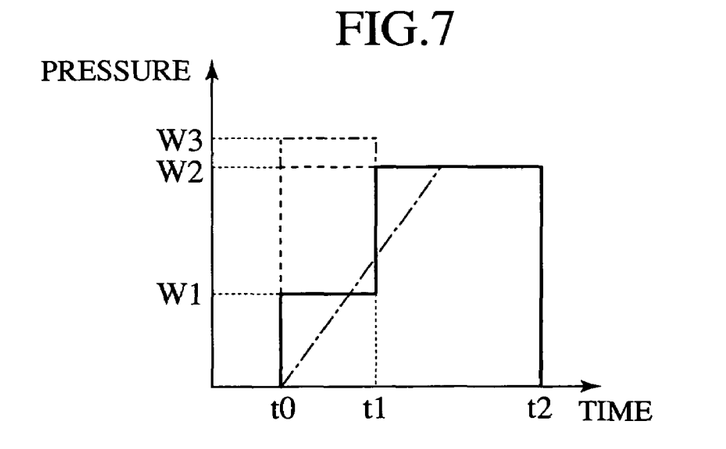
FIG. 7 is a diagram showing an example of a relation between pressure applied by the compression tool and time in the embodiment of the present invention.

On the contrary, when it is desired to reduce the elongation amount of the electronic parts 2, the control device 80 adjusts air pressure supplied to the air cylinder 48 through the pressure control section 83 so that, during a period from the start time t0 of the thermocompression bonding operation until the completion time t2 thereof, the pressure applied by the compression tool 44 is set to the predetermined pressure W2 as shown in by a broken line in FIG. 7.

Note that, when the elongation amount of the electronic parts 2 is adjusted to a larger amount, the control device 80 may control the pressure control section 83 so that the pressure applied to the electronic parts 2 by the compression tool 44 is gradually increased from the start time t0 of the thermocompression bonding operation as shown by an alternate short and long dash line in FIG. 7. Alternatively, the control device 80 may control the pressure in a multistage fashion including two or more stages.

On the other hand, when the elongation amount of the electronic parts 2 is adjusted to a smaller amount, the control device 80 may control the pressure control section 83 so that the following is realized. As shown by an alternate long and two short dashes line in FIG. 7, during the period from the start time t0 of the thermocompression bonding operation until the time t1, the pressure applied to the electronic parts 2 by the compression tool 44 is W3 which is larger than the predetermined pressure W2. During a period from the time t1 until the completion time t3 of the thermocompression bonding operation, the pressure applied to the electronic parts 2 is set to the predetermined pressure W2.

2) Heating Temperature Control

When it is desired to increase the elongation amounts of the electronic parts 2, the control device 80 adjusts the heating value of the heater 43 through the temperature control section 85 so that the following is realized. As shown by a solid line in FIG. 8, during the period from the start time t0 of the thermocompression bonding operation until the completion time t2 thereof, the temperature of the compression tool 44 is maintained at the predetermined temperature T2 required for the thermocompression bonding.

On the contrary, when it is desired to reduce the elongation amount of the electronic parts 2, the control device 80 adjusts the heating value of the heater 43 through the temperature control section 85 so that the following is realized. As shown by a broken line in FIG. 8, during the period from the start time t0 of the thermocompression bonding operation until the time t1, the temperature of the compression tool 44 is maintained at temperature T1 which is lower than the predetermined temperature T2. During the following period until the completion time t2 of the compression bonding operation is set to the predetermined temperature T2.

Note that, when the elongation amount of the electronic parts 2 is adjusted to a larger amount, the temperature control section 85 may be controlled as follows. As shown by an alternate short and long dash line in FIG. 8, the temperature of the compression tool 44 is maintained at temperature T3 which is higher than the predetermined temperature T2 during the period from the start time t0 of the thermocompression bonding operation until the time t1.

Figure 8:
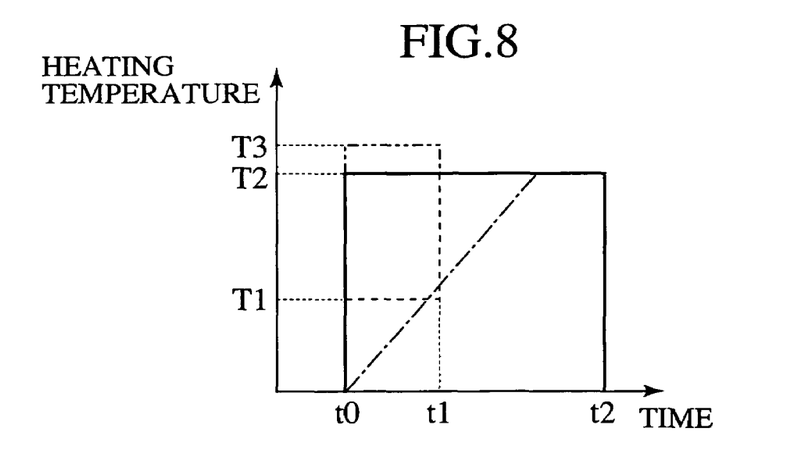
FIG. 8 is a diagram showing a relation between temperature applied to the compression tool and time in the embodiment of the present invention.

On the other hand, when the elongation amount of the electronic parts 2 is adjusted to a smaller amount, the temperature control section 85 may be controlled so that the temperature of the compression tool 44 is gradually increased from the start time t0 of the thermocompression bonding operation as shown by an alternate long and two short dashes line in FIG. 8. Alternatively, the temperature of the compression tool 44 may be controlled in multistage including two or more stages.

Furthermore, the control device 80 may perform the temperature control of both the compression tool 44 and the back-up tool 62 through the temperature control section 85.

Instead of changing the temperature of the compression tool 44 and the back-up tool 62, the heating temperature applied to the electronic parts 2 may be controlled by the use of the cooling member 64 which is attached to the back-up tool 62.

Figure 9:
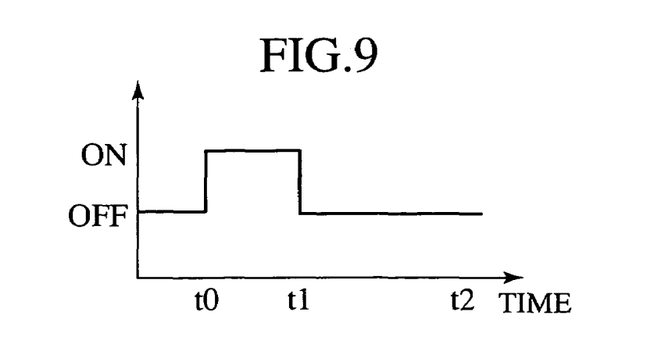
FIG. 9 is a diagram showing an example of operation timing of a cooling device in the embodiment of the present invention.

FIG. 9 shows an example of temperature control using the cooling member 64. As shown in FIG. 9, for example, during the period from the start time t0 of the thermocompression bonding operation until the time t1, the control device 80 activates the cold air supply device 65 to an ON state to supply cold air to the cooling member 64 and drops the temperature of the back-up tool 62. Even if the temperature of the compression tool 44 is set to the predetermined temperature T2 from the start time t0 of the thermocompression bonding operation, due to activation of the cold air supply device 65, the temperature from the compression tool 44 is removed during the period from the start time t0 of the thermocompression bonding operation until the time t1, by the back-up tool 62 whose temperature has been reduced by the cooling member 64. Therefore, the temperature of the electronic parts 2 is prevented from increasing and maintained at the temperature T1 that is lower than the predetermined temperature T2. When controlling the heating temperature applied to the electronic parts 2 by the use of the cooling device 63 during the thermocompression bonding operation as mentioned above, the temperature can be changed swiftly in comparison with the case where the temperature to heat the electronic parts 2 is controlled by controlling the temperature of the heaters provided in the compression tool 44 and the back-up tool 62. This is because, time required for raising temperature of the heaters 43 and 61 is not necessary.

Incidentally, each type of the electronic parts 2 has different elongation properties.

Next, an example of the aforementioned pressure and temperature control based on the type of the electronic parts 2 is described.

The electronic part used as a driver IC of a liquid crystal display includes, for example, a TCP (tape carrier package) and a COF (chip on film). Both of these parts have a form in which an IC is mounted on a film, and are bonded to a substrate by thermocompression through a connection member.

In the TCP and COF, thicknesses of base films which elongate during thermocompression bonding are different. Hence, an elongation amount of each of the base films thereof differs from each other when bonded by thermocompression under the same conditions.

For example, when a TCP with a thickness of 75 µm and a COF with a thickness of 40 µm are heated and pressed under the same thermocompression bonding conditions, the elongation of the 40 µm-thick COF is smaller than that of the TCP.

Figure 10:
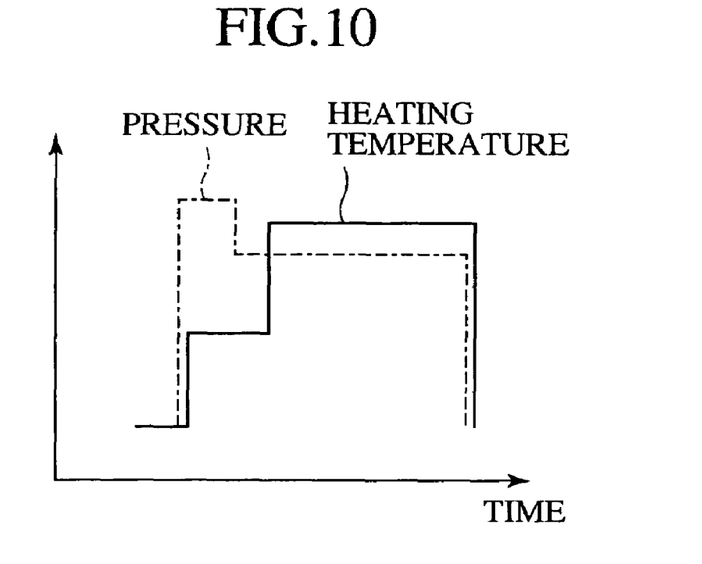
FIG. 10 is a diagram showing an example of compression bonding conditions in a case where TCPs (tape carrier packages) are used as the electronic parts.
Figure 11:
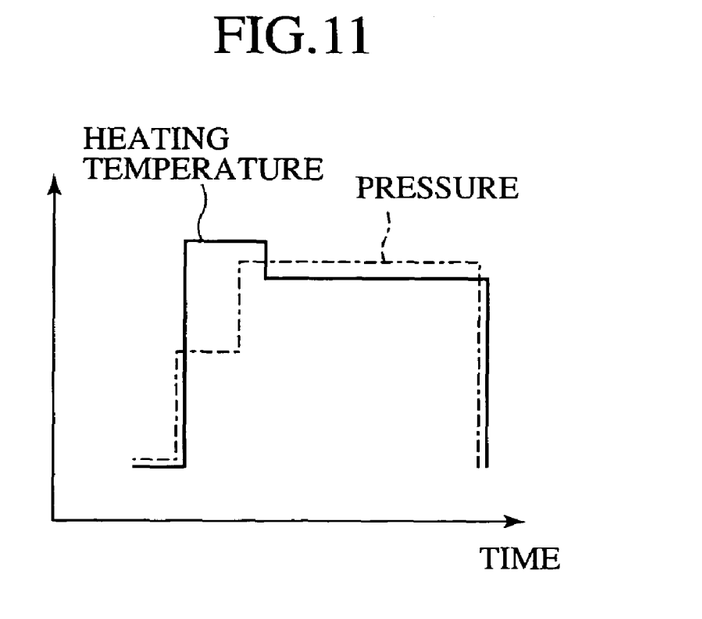
FIG. 11 is a diagram showing an example of compression bonding conditions in a case where COFs (chip on films) are used as the electronic parts.

In order to compensate for the difference of the elongation amounts, the control device 80 controls the temperature and pressure so that the electronic parts 2 are bonded by thermocompression with pressure and heating temperature shown in FIG. 10 when the electronic parts 2 are the TCPs, and with pressure and heating temperature shown in FIG. 11 when the electronic parts 2 are the COFs. Thus, the equal elongation can be obtained in the TCPs and COFs.

Next, a description is provided concerning control of the pressure and heating temperature applied to the electronic parts 2 based on properties of the connection member which connects the electronic parts 2 to the glass substrate 1.

Figure 12A:
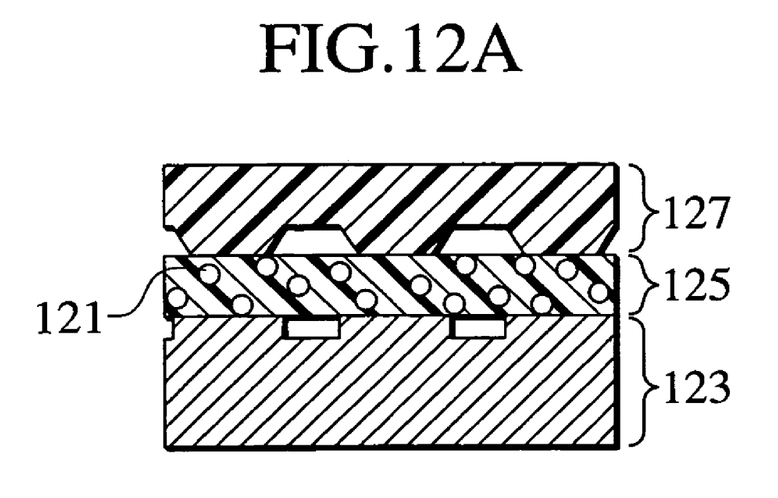
FIGS. 12A and 12B are cross-sectional views showing a construction of an ACF (anisotropic conductive film) which connects the electronic parts and a liquid crystal display.
Figure 12B:
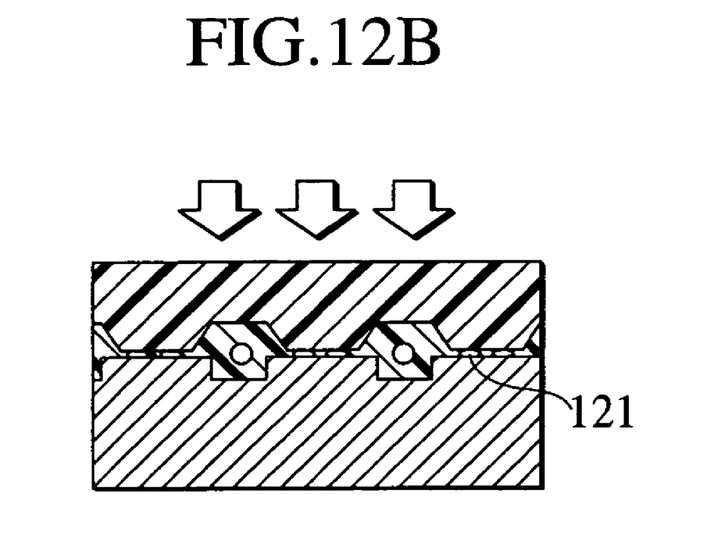

FIGS. 12A and 12B are views explaining a construction of an anisotropic conductive film (ACF) which is one of the connection members that connect the electronic parts 2 to the glass substrate 1. The ACF is generally used, for example, in order to connect electronic parts to a substrate. To be more specific, the ACF 125 is the connection member for the TCPs 127 which are the electronic parts and the liquid crystal display (LCD) 123 which is the substrate as shown in FIG. 12A. The ACF 125 is made of, for example, thermosetting resin with a thickness of 15 µm and conductive particles 121 having particle sizes of about 5 µm and uniformly distributed within the thermosetting resin. As shown in FIG. 12B, by applying pressure to the TCP 127, the lead portions of the TCP 127 and the LCD 123 are electrically connected through the conductive particles 121. In addition, by heating the TCP 127, the thermosetting resin hardens and thereby the TCP 127 as the electronic part and the LCD 123 are mechanically connected.

Figure 13:
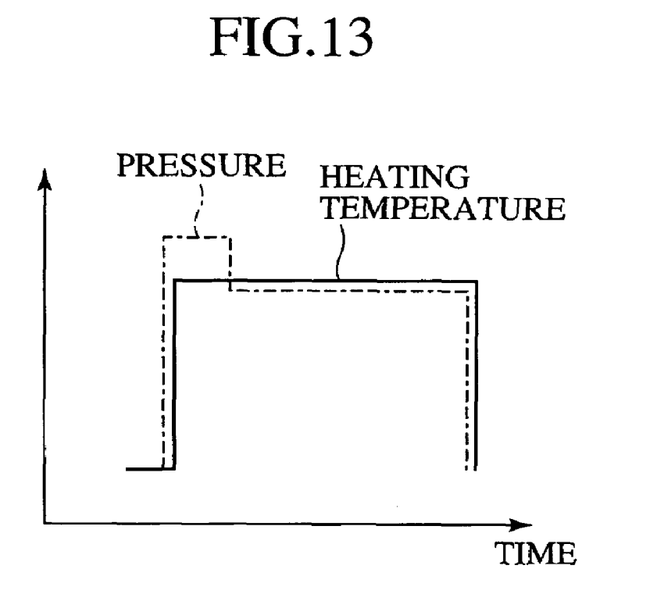
FIG. 13 is a diagram showing an example of compression bonding conditions in a case of using an ACF which starts hardening at high temperature.
Figure 14:
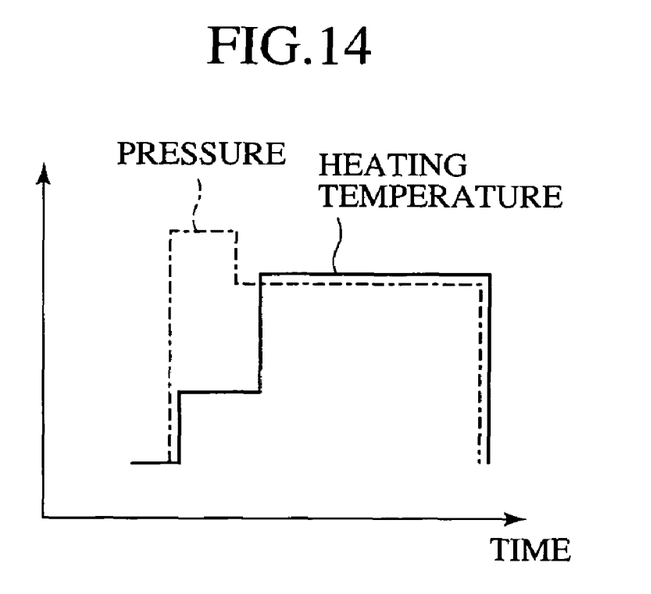
FIG. 14 is a diagram showing an example of compression bonding conditions in a case of using an ACF which starts hardening at low temperature.

Hardening of the ACF has the effect of suppressing the elongation of the electronic parts 2. Specifically, a relation between the compression bonding temperature and hardening speed varies depending on the type of the thermosetting resin constructing the ACF. Generally, the elongation amount of the electronic parts 2 is suppressed when the ACF which starts hardening at low temperature is used in the initial stage of compression bonding. On the other hand, the electronic parts 2 are further elongated when the ACF which starts hardening at high temperature is used. Therefore, in order to accurately control the elongation amount of the electronic parts 2, it is required to set the thermocompression bonding conditions with consideration of the difference in ACF hardening properties for different temperature. For example, as for the ACF which easily hardens at high temperature, the thermocompression boning is carried out by controlling the pressure and heating temperature as shown in FIG. 13. On the other hand, as for the ACF which easily hardens at low temperature, the thermocompression bonding is carried out by controlling the pressure and heating temperature as shown in FIG. 14. Thus, the equal elongation amounts of the electronic parts 2 can be obtained in both types of ACFs. When the heating temperature is increased, however, the effect of promoting elongation of the electronic parts 2 and the effect of suppressing elongation of the same due to hardening of the ACF occur at the same time. Therefore, it is required to decide the thermocompression bonding conditions under consideration of a balance of both effects.

It is to be noted that setting of the thermocompression bonding conditions based on the type of the electronic parts 2 was described in the foregoing. However, the thermocompression bonding conditions may be changed as appropriate depending on other factors such as the compression bonding temperature, the type of the adhesive to adhere the electronic parts 2 to the glass substrate 1, and a material of a member constructing the electronic part 2, and then the changed conditions may be set in the storage section 81.

3) Speed Control

Figure 15:
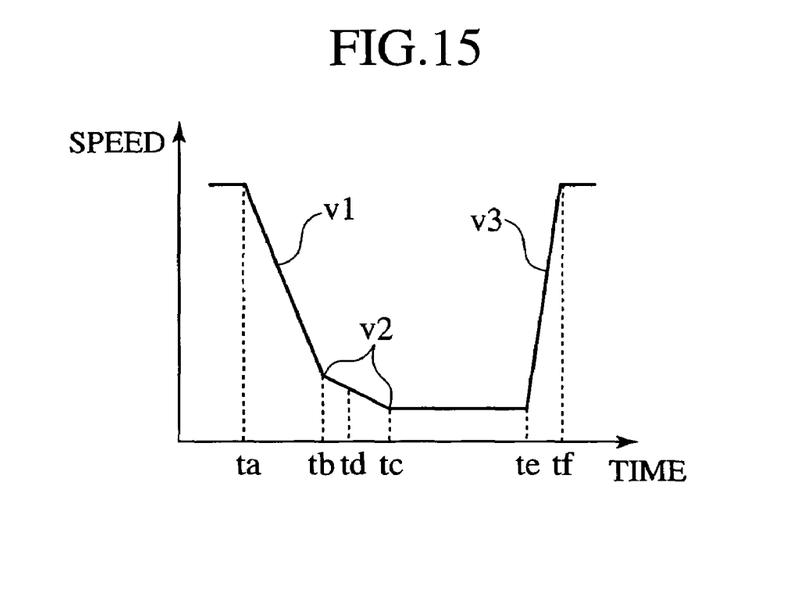
FIG. 15 is a timing chart showing a raising/lowering operation of the compression tool in the embodiment of the present invention.

FIG. 15 is a timing chart showing a raising/lowering operation of the base plate 45 when bonding the electronic parts 2 by thermocompression. In FIG. 15, the base plate 45 starts descending from time point ta when descent starts and then descends at a high speed v1 during a period until a time point tb when the compression tool 44 reaches a position slightly above the electronic parts 2. After the time point tb, the speed is changed to a speed (contacting speed) v2 for preparation for contacting the electronic parts 2. This speed is maintained until a time point tc over a contacting time point td. Note that the compression tool 44 comes into contact with the electronic parts 2 at the contacting point td (which is, at the same time, a time point when the thermocompression bonding operation starts). Therefore, the actuation rod 48a of the air cylinder 48 is pushed back by a predetermined amount due to relative displacement of the compression tool 44 and the base plate 45. Thereafter, the base plate 45 is stopped from the time point tc until a time point te when the thermocompression bonding operation is completed, and then raised to a stand-by position at a speed v3 until a time point tf. Note that these operations mentioned above are carried out by the control device 80 controlling drive of the motor 49 through the motor control section 84.

In the speed control according to this embodiment, the contacting speed v2 between the time points tb and tc is adjusted.

For example, when it is desired to increase the elongation amount of the electronic parts 2, the control device 80 controls the speed of the motor 49 through the motor control section 84 so that the contacting speed v2 is reduced. Thus, an impact load applied when the compression tool 44 comes into contact with the electronic parts 2 is reduced.

On the other hand, when it is desired to reduce the elongation amount of the electronic parts 2, the control device 80 controls the speed of the motor 49 through the motor control section 84 so that the contacting speed v2 is increased. Thus, the impact load applied when the compression tool 44 comes into contact with the electronic part 2 is increased. By increasing the impact load, pressure applied when the compression tool 44 comes into contact with the electronic parts 2 is further increased. Therefore, the force of constraint to the elongation of the electronic parts is increased, enabling suppression of the elongation amount of the electronic parts 2.

Note that, by setting the speeds v1 and v3 to be higher than the contacting speed v2 in the period of thermocompression bonding operation, the time required for one process can be shortened. Hence, productivity is improved in bonding the electronic parts to the substrate by thermocompression.

Figure 16:
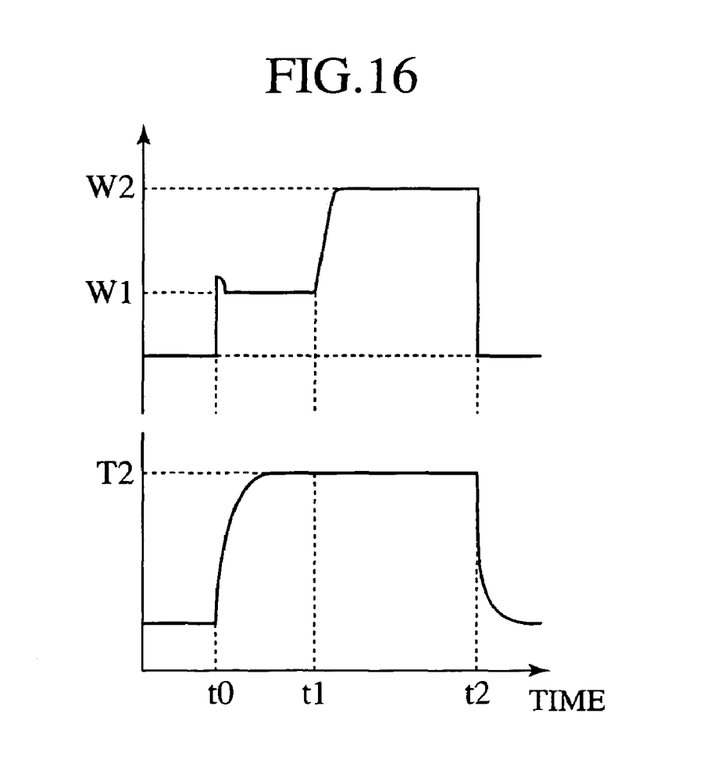
FIG. 16 is a diagram showing an example of conditions of pressure and heat applied to the electronic parts in the embodiment of the present invention.
Figure 17:
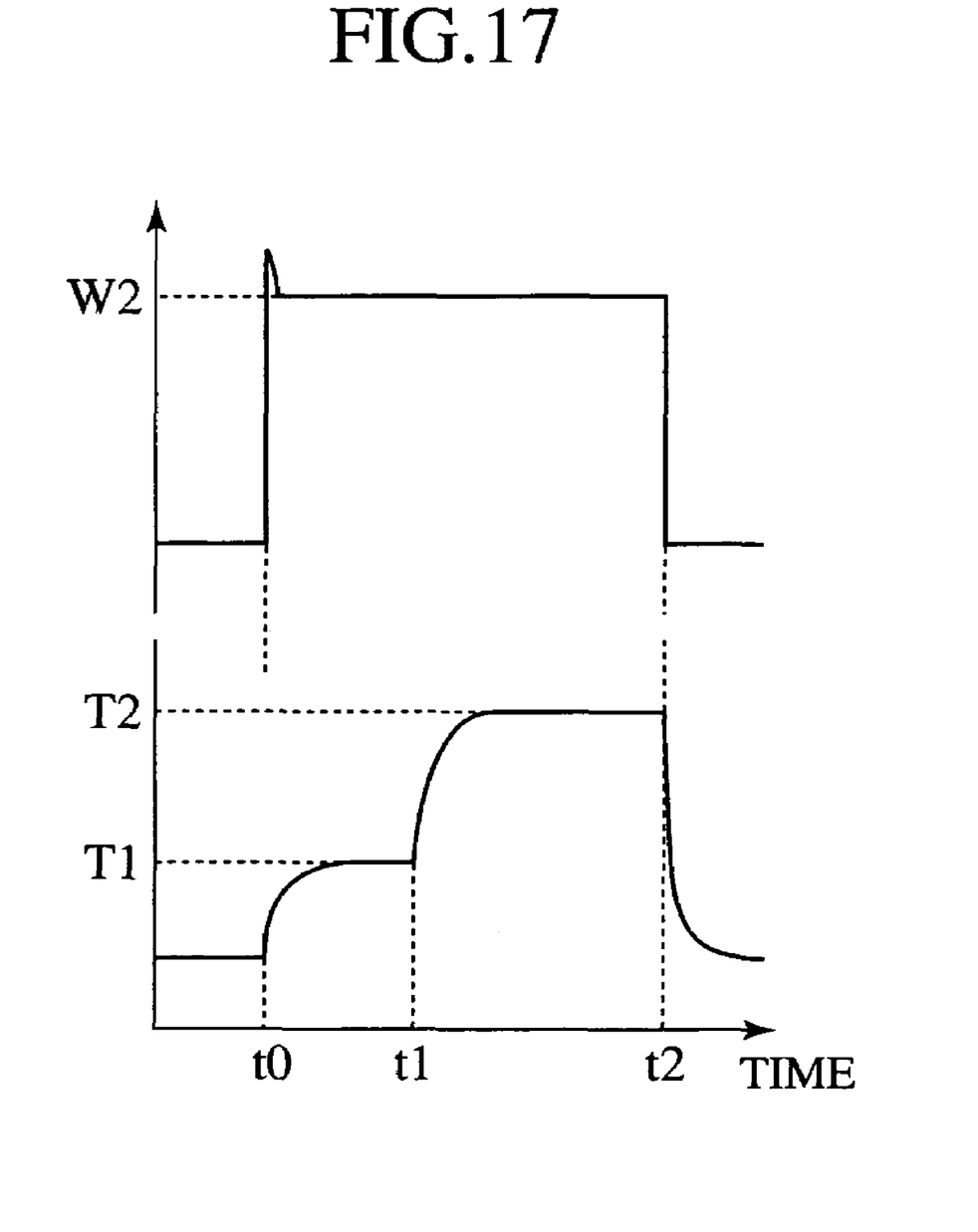
FIG. 17 is a diagram showing another example of conditions of pressure and heat applied to the electronic parts in the embodiment of the present invention.

Next, with reference to FIGS. 16 and 17, a description is given regarding examples of pressure and heating temperature conditions of the electronic parts 2 in the cases of adjusting the elongation amount of the electronic parts 2 to a larger amount and to a smaller amount.

FIG. 16 is a diagram showing the states of pressure and heating temperature applied to the electronic parts 2 when the elongation amount of the electronic parts 2 is adjusted to a larger amount by adjusting the pressure applied by the compression tool 44 and temperature during compression bonding. Specifically, for example, the pressure applied by the compression tool 44 is controlled under a condition shown by a solid line in FIG. 7, and the heating temperature of the compression tool 44 is controlled under a condition shown by a solid line in FIG. 8.

According to these conditions, as far as the heating temperature is concerned, the electronic parts 2 are heated at the predetermined temperature T2 required for thermocompression bonding immediately after the start time t0 of the thermocompression bonding operation. As far as the pressure is concerned, the electronic parts 2 are pressed with the pressure W1 which is smaller than the predetermined pressure W2 required for thermocompression bonding, during the period from the time t0 until the time t1. Therefore, the force of constraint to elongation of the electronic parts 2 is small during the period between the time t0 and the time t1, in comparison with the case where the predetermined pressure W2 and the predetermined temperature T2 are applied to the electronic parts 2 from the time t0. Thus, the electronic parts 2 are easily elongated. As a result, the elongation amount of the electronic parts 2 bonded by thermocompression becomes larger than that of the electronic parts 2 to which the predetermined pressure and temperature W2 and T2 are applied from the time t0.

FIG. 17 is a diagram showing the states of the pressure and heating temperature applied to the electronic parts 2 when the elongation amount of the electronic parts 2 is adjusted to a smaller amount by adjusting the pressure applied by the compression tool 44 and temperature during compression bonding. Specifically, for example, the pressure applied by the compression tool 44 is controlled under a condition shown by a broken line in FIG. 7, and the heating temperature of the compression tool 44 is controlled under a condition shown by a broken line in FIG. 8.

According to these conditions, the predetermined pressure W2 required for thermocompression bonding is applied to the electronic parts 2 from the start time t0 of the thermocompression bonding operation. The temperature of the compression tool 44 is set to the temperature T1 which is lower than the predetermined temperature T2 required for the thermocompression bonding operation, during the period from the time t0 until the time t1. Therefore, elongation of the electronic parts 2 is small during the period between the time t0 and the time t1, in comparison with the case where the predetermined pressure W2 and the predetermined temperature T2 are applied to the electronic parts 2 from the time t0. As a result, the elongation amount of the electronic parts 2 bonded by thermocompression becomes smaller than that of the electronic parts 2 to which the predetermined pressure and temperature W2 and T2 are applied from the time t0.

Thus, according to this embodiment mentioned above, the temperature condition of the compression tool 44, the pressure conditions by the compression tool 44, the impact load application condition and the like are adjusted. Thus, heating and compression states of the electronic parts 2 to be heated during the period of the thermocompression bonding operation can be adjusted. Accordingly, the elongation amount of the electronic parts 2 during the period of the thermocompression bonding operation and the force of constraint to the elongation thereof can be controlled. Thus, the elongation amount of the electronic parts to be bonded by thermocompression can be accurately adjusted, and thereby preventing poor connection of the electronic parts.

Note that, in the aforementioned embodiment, each of the thermocompression bonding conditions stored in the storage section 81 may be set and stored in the storage section 81 by an operator every time a variable element of the thermocompression conditions, such as the type of the electronic parts 2, is changed. Alternatively, the thermocompression conditions based on each type of the electronic parts 2 are obtained by testing or the like and stored in the storage section 81 in advance. Therefore, when the variable element of the thermocompression conditions such as the type of the electronic parts 2 is changed, the control device 80 may select the thermocompression bonding conditions corresponding to the type of the electronic parts 2 out of the thermocompression conditions stored in the storage section 81 by inputting type information.

Moreover, it was described in the foregoing example that the descending speed of the compression tool 44 is controlled to be the contacting speed v2 during the period between tb and tc shown in FIG. 15. However, the contacting speed v2 should be maintained at least until the time point td when the compression tool 44 comes into contact with the electronic parts 2. Therefore, the descending speed of the compression tool 44 after the time td may be controlled to be a different speed from the contacting speed v2, for example, a speed higher than the contacting speed v2.

Further, it was described in the foregoing example that cold air is supplied to the cooling member 64 of the cooling device 64 and thus the temperature of the back-up tool 62 is dropped. However, the cooling medium to be supplied to the cooling member 64 may not be air but, for example, water.

Furthermore, the cooling device 63 may cool down not only the back-up tool 62 but also the compression tool 44. Specifically, the cooling device 64 may be attached to the side of the compression tool 44.

Furthermore, it was described in the foregoing example that the back-up tool 62 is cooled down by the cooling device 63. However, portions which are bonded by compression, such as the electronic parts 2 and the glass substrate 1, may be directly cooled down during the period of the thermocompression bonding operation of the electronic parts 2 by the compression tool 44. This can be achieved by directly contacting the cooling member 64 to the electronic parts 2 or the glass substrate 1. As a matter of course, this can also be achieved by blowing cold air from a nozzle or the like directly to the electronic parts 2 or the glass substrate 1.

When direct cold air blow is used to cool down the glass substrate 1 during the thermocompression bonding, cold air cannot be blown directly to the glass substrate 1 to be cooled down since the glass substrate 1 is sandwiched by the compression tool 44 and the back-up tool 62 which block the cold air. Thus, cooling of the glass substrate 1 becomes less efficient. On the contrary, by providing a cooling mechanism on the side of the back-up tool 62 on the opposite side of the compression tool 44 which is a heating mechanism, heat applied to the glass substrate 1 is removed to the side of the back-up tool 62, thus improving cooling efficiency.

Moreover, it was described in the forgoing example that the ascent/descent speed of the compression tool 44 is changed by controlling rotation of the motor 49, and the pressure applied by the compression tool 44 is changed by controlling air pressure supplied to the air cylinder 48. However, a single drive device maybe used to control the ascent/descent speed of the compression tool 44 and pressure applied by the same may be performed.

Furthermore, needless to say, the material of the substrate is not limited to glass and the connecting material is not limited to the anisotropic conductive film.

Note that the present invention is not limited to the foregoing embodiment. Needless to say, various changes and modifications may be made without departing from the gist of the present invention. All of these changes and modifications should be included within the scope of the present invention.

INDUSTRIAL APPLICABILITY

According to the electronic part compression bonding apparatus and method of the present invention, elongation amounts of the electronic parts can be accurately adjusted, thus preventing poor connection between the electronic parts and the substrate.

The electronic part compression bonding apparatus and method of the present invention are useful as they can be broadly used for technologies related to mounting of the electronic parts on various types of substrates and improve accuracy in electronic part mounting.

The invention claimed is:

1. An electronic part compression bonding apparatus, comprising:
    a compression bonding unit which performs thermocompression bonding of electronic parts by pressing the electronic parts onto a substrate by a raising/lowering operation of a lifting unit;
    a pressure supply unit which applies pressure to the compression bonding unit;
    a pressure control unit which controls pressure supplied by the pressure supply unit;
    a heating unit which is built in the compression bonding unit and heats the compression bonding unit;
    a temperature control unit which controls a heating value of the heating unit;
    a substrate support unit which is located to face the compression bonding unit and supports the substrate during a thermocompression bonding operation by the compression bonding unit; and
    a thermocompression bonding control unit which controls the pressure control unit and the heating unit based on thermocompression bonding condition data stored in a storage section, the thermocompression bonding condition data depending on elongation properties of the electronic parts, wherein at least one of pressure and heating temperature is variably set during a process from start until completion of the thermocompression bonding operation of the electronic parts in the thermocompression bonding condition data,
    wherein, in the thermocompression bonding condition data, the pressure is set to a first pressure, which is higher than a pressure required for the thermocompression bonding, at a first stage of the process of the thermocompression bonding operation and to a second pressure, which is lower than the first pressure, in a second stage which follows the first stage, so as to adjust an elongation amount of the electronic parts to a smaller amount.

2. The electronic part compression bonding apparatus according to claim 1,
    wherein, in the thermocompression bonding condition data, the heating temperature is set to first heating temperature at the first stage and to second heating temperature, which is higher than the first heating temperature, in the second stage which follows the first stage.

3. The electronic part compression bonding apparatus according to claim 1,
    wherein the thermocompression bonding control unit moves from the first stage to the second stage in the process, after predetermined time t is elapsed, and the predetermined time t is variably decided based on any one or more of a type of the electronic parts to be bonded onto the substrate by thermocompression, compression bonding temperature, or a type of an adhesive which adheres the electronic parts to the substrate.

4. The electronic part compression bonding apparatus according to claim 1, further comprising:
    a speed control unit which controls an ascent/descent speed of the lifting unit,
    wherein, in the thermocompression bonding condition data, a first ascent/descent speed before the compression bonding unit comes into contact with the electronic parts to be bonded onto the substrate by thermocompression and after completion of the thermocompression bonding is set higher than a second ascent/descent speed after the compression bonding unit contacts the electronic parts.

5. The electronic part compression bonding apparatus according to claim 1, further comprising:
    a second heating unit which is built in the substrate support unit and heats the substrate support unit; and
    a second temperature control unit which controls a heating value of the second heating unit,
    wherein the thermocompression bonding control unit controls the second temperature control unit based on the thermocompression bonding condition data stored in the storage section.

6. An electronic part compression bonding apparatus, comprising:
    a compression bonding unit which performs thermocompression bonding of electronic parts by pressing the electronic parts onto a substrate by a raising/lowering operation of a lifting unit;
    a pressure supply unit which applies pressure to the compression bonding unit;
    a pressure control unit which controls pressure supplied by the pressure supply unit;
    a heating unit which is built in the compression bonding unit and heats the compression bonding unit;
    a temperature control unit which controls a heating value of the heating unit;
    a substrate support unit which is located to face the compression bonding unit and supports the substrate during a thermocompression bonding operation by the compression bonding unit; and
    a cooling unit which cools a cooling member which is located in the substrate support unit; and
    a thermocompression bonding control unit which controls the temperature control unit and the cooling unit based on thermocompression bonding condition data stored in a storage section, the thermocompression bonding condition data depending on elongation properties of the electronic parts, wherein the heating temperature is variably set during a process from start until completion of the thermocompression bonding operation of the electronic parts in the thermocompression bonding condition data,
    wherein, in the thermocompression bonding condition data, the temperature is set to a first temperature, which is lower than a temperature required for the thermocompression bonding, at a first stage of the process of the thermocompression bonding operation and to a second temperature, which is higher than the first temperature, in a second stage which follows the first stage, so as to adjust an elongation amount of the electronic parts to a smaller amount.

7. The electronic part compression bonding apparatus according to claim 6,
    wherein the cooling unit cools the cooling member by supplying cold air to the cooling member, and the thermocompression bonding control unit performs on/off control of cold air supply to the cooling member from the cooling unit.

8. The electronic part compression bonding apparatus according to claim 6, further comprising:
a second heating unit which is built in the substrate support unit and heats the substrate support unit; and
a second temperature control unit which controls a heating value of the second heating unit.

9. An electronic part compression bonding apparatus, comprising:
a compression bonding unit which performs thermocompression bonding of electronic parts by pressing the electronic parts onto a substrate by a raising/lowering operation of a lifting unit;
a pressure supply unit which applies pressure to the compression bonding unit;
a pressure control unit which controls pressure supplied by the pressure supply unit;
a heating unit which is built in the compression bonding unit and heats the compression bonding unit;
a temperature control unit which controls a heating value of the heating unit;
a substrate support unit which is located to face the compression bonding unit and supports the substrate during a thermocompression bonding operation by the compression bonding unit;
a thermocompression bonding control unit which controls the pressure control unit and the heating unit based on thermocompression bonding condition data which is stored in a storage section and in which at least one of pressure and heating temperature is variably set during a process from start until completion of the thermocompression bonding operation of the electronic parts; and
a temperature detection unit which measures the temperature to heat the electronic parts during a period of the thermocompression bonding and sends first detection data which indicates to the thermocompression bonding control unit that the temperature of the electronic parts has reached predetermined temperature,
wherein, upon receipt of the first detection data sent from the temperature detection unit, the thermocompression bonding control unit instructs the pressure control unit to change the pressure from first pressure to second pressure which is lower than the first pressure.

10. The electronic part compression bonding apparatus according to claim 9, further comprising:
a pressure detection unit which measures pressure applied to the electronic parts during the period of the thermocompression bonding and sends second detection data which indicates to the thermocompression bonding control unit that the pressure applied to the electronic parts has reached predetermined pressure,
wherein, upon receipt of the second detection data sent from the pressure detection unit, the thermocompression bonding control unit instructs the temperature control unit to change the temperature from first temperature to second temperature which is higher than the first temperature.

11. An electronic part thermocompression bonding method in which electronic parts are heated by a heating unit built in a compression bonding unit and pressed onto a substrate by raising/lowering the compression bonding unit to bond the electronic parts onto the substrate by thermocompression, the method comprising;

previously storing, in a storage section, thermocompression bonding condition data in which at least one of a pressure setting and a heating temperature is variably set during a process from start until completion of a thermocompression bonding operation of the electronic parts, the thermocompression bonding condition data depending on elongation properties of the electronic parts; and
controlling pressure supplied to the electronic parts by the compression bonding unit so that, during the thermocompression bonding operation of the electronic parts, the pressure becomes a first pressure, which is higher than a pressure required for the thermocompression bonding, in a first stage of a process of the thermocompression bonding operation and a second pressure, which is lower than the first pressure, in a second stage which follows the first stage, so as to adjust an elongation amount of the electronic parts to a smaller amount, based on the thermocompression bonding condition data stored in the storage section.

12. The electronic part thermocompression bonding method according to claim 11,
wherein the controlling controls temperature to heat the compression unit so that the temperature becomes a first heating temperature in the first stage of the process of the thermocompression bonding operation and a second heating temperature, which is higher than the first heating temperature, in the second stage which follows the first stage, based on the thermocompression bonding condition data stored in the storage section.

13. An electronic part compression bonding apparatus, comprising:
a compression bonding unit which performs thermocompression bonding of electronic parts by pressing the electronic parts onto a substrate by a raising/lowering operation of a lifting unit;
a pressure supply unit which applies pressure to the compression bonding unit;
a pressure control unit which controls pressure supplied by the pressure supply unit;
a heating unit which is built in the compression bonding unit and heats the compression bonding unit;
a temperature control unit which controls a heating value of the heating unit;
a substrate support unit which is located to face the compression bonding unit and supports the substrate during a thermocompression bonding operation by the compression bonding unit; and
a thermocompression bonding control unit which controls the pressure control unit and the heating unit based on thermocompression bonding condition data which is stored in a storage section and in which at least one of pressure and heating temperature is variably set during a process from start until completion of the thermocompression bonding operation of the electronic parts,
wherein, in the thermocompression bonding condition data, the heating temperature is set to a temperature required for thermocompression bonding after a start time of a thermocompression bonding operation, and the pressure is set to be smaller than a pressure required for thermocompression bonding for a predetermined time period and then set to a pressure required for thermocompression bonding.

* * * * *